United States Patent
Moon et al.

(10) Patent No.: US 6,985,837 B2
(45) Date of Patent: Jan. 10, 2006

(54) SYSTEM PRESENTING METEOROLOGICAL INFORMATION USING A BROWSER INTERFACE

(76) Inventors: Dennis A. Moon, c/o WindLogics, Inc., 1217 Bandana Blvd. North, St. Paul, MN (US) 55108; Neil R. Lincoln, c/o WindLogics, Inc., 1217 Bandana Blvd. North, St. Paul, MN (US) 55108; Rex Filstrup, c/o WindLogics, Inc., 1217 Bandana Blvd. North, St. Paul, MN (US) 55108; Rolf D. Miller, c/o WindLogics, Inc., 1217 Bandana Blvd. North, St. Paul, MN (US) 55108; Eric Christeson, c/o WindLogics, Inc., 1217 Bandana Blvd. North, St. Paul, MN (US) 55108; Ningsheng Huang, c/o WindLogics, Inc., 1217 Bandana Blvd. North, St. Paul, MN (US) 55108; Michael T. C. Johnson, c/o WindLogics, Inc., 1217 Bandana Blvd. North, St. Paul, MN (US) 55108; Brian Lincoln, c/o WindLogics, Inc., 1217 Bandana Blvd. North, St. Paul, MN (US) 55108; John R. Makosky, c/o WindLogics, Inc., 1217 Bandana Blvd. North, St. Paul, MN (US) 55108; Brian K. Smith, c/o WindLogics, Inc., 1217 Bandana Blvd. North, St. Paul, MN (US) 55108; Elizabeth Wiethoff, c/o WindLogics, Inc., 1217 Bandana Blvd. North, St. Paul, MN (US) 55108

( * ) Notice: Subject to any disclaimer, the term of this patent is extended or adjusted under 35 U.S.C. 154(b) by 0 days.

(21) Appl. No.: 10/286,473

(22) Filed: Nov. 1, 2002

(65) Prior Publication Data

US 2004/0162675 A1 Aug. 19, 2004

Related U.S. Application Data

(60) Provisional application No. 60/335,310, filed on Nov. 1, 2001.

(51) Int. Cl.
*G01V 1/00* (2006.01)

(52) U.S. Cl. .......................................... 703/3; 345/419
(58) Field of Classification Search .................... 702/3, 702/2; 340/601; 434/2; 345/419; 701/212; 705/8
See application file for complete search history.

(56) References Cited

U.S. PATENT DOCUMENTS 5,379,215 A * 1/1995 Kruhoeffer et al. ............ 702/3
5,409,379 A * 4/1995 Montag et al. ................ 434/2

(Continued)

*Primary Examiner*—John E. Barlow
*Assistant Examiner*—Victor J. Taylor
(74) *Attorney, Agent, or Firm*—Patterson, Thuente, Skaar & Christensen, P.A.

(57) ABSTRACT

A system for presenting meteorological information uses a browser interface to access massive amounts of weather-related data in the form of images stored on the server-side of the system. A user having a common browser on a Web client accesses the server-side information to selectively assemble weather-related data on multiple overlays of images and/or graphics into one simultaneous presentation on a Web page. The different overlays are normalized with respect to time and space, and a user can separately generate graphically miniaturized presentations of weather-related data for saving and subsequently recalling each presentation, wherein each presentation is displayed with current relativized data. The user can also select or customize derived variables to be distinctively displayed as part of a presentation.

12 Claims, 15 Drawing Sheets

U.S. PATENT DOCUMENTS

| | | | | |
|---|---|---|---|---|
| 5,480,305 A | * | 1/1996 | Montag et al. | 434/2 |
| 5,491,629 A | * | 2/1996 | Fox et al. | 702/3 |
| 5,517,193 A | * | 5/1996 | Allison et al. | 342/26 R |
| 5,521,813 A | * | 5/1996 | Fox et al. | 705/8 |
| 5,568,385 A | * | 10/1996 | Shelton | 702/3 |
| 5,583,972 A | * | 12/1996 | Miller | 345/419 |
| 5,630,718 A | * | 5/1997 | Montag et al. | 434/2 |
| 5,717,589 A | * | 2/1998 | Thompson et al. | 702/3 |
| 5,796,932 A | * | 8/1998 | Fox et al. | 707/104.1 |
| 5,848,375 A | * | 12/1998 | Nunobiki et al. | 701/212 |
| 5,848,378 A | * | 12/1998 | Shelton et al. | 702/3 |
| 5,870,549 A | * | 2/1999 | Bobo, II | 709/206 |
| 6,018,699 A | * | 1/2000 | Baron, Sr. et al. | 702/3 |
| 6,125,328 A | * | 9/2000 | Baron et al. | 702/3 |
| 6,208,938 B1 | * | 3/2001 | Doerfel | 702/3 |
| 6,266,063 B1 | * | 7/2001 | Baron et al. | 245/419 |
| 6,269,309 B1 | * | 7/2001 | Buckingham | 702/3 |
| 6,275,774 B1 | * | 8/2001 | Baron, Sr. et al. | 702/3 |
| 6,298,307 B1 | * | 10/2001 | Murphy et al. | 702/3 |
| 6,339,747 B1 | * | 1/2002 | Daly et al. | 702/3 |
| 6,343,255 B1 | * | 1/2002 | Peek et al. | 702/3 |
| 6,351,218 B1 | * | 2/2002 | Smith | 340/601 |
| 6,356,843 B1 | * | 3/2002 | Baron et al. | 702/3 |
| 6,360,172 B1 | * | 3/2002 | Burfeind et al. | 702/2 |
| 6,397,163 B1 | * | 5/2002 | Hoyt et al. | 702/136 |
| 6,401,039 B1 | * | 6/2002 | Baron et al. | 702/3 |
| 6,405,134 B1 | * | 6/2002 | Smith et al. | 702/4 |
| 6,442,554 B1 | * | 8/2002 | Reddy et al. | 707/100 |

* cited by examiner

SYSTEM PRESENTING METEOROLOGICAL INFORMATION USING A BROWSER INTERFACE

RELATED APPLICATION

This application claims the benefit of U.S. Provisional Application No. 60/335,310, filed on Nov. 1, 2001, hereby incorporated herein in its entirety by reference.

COMPACT DISC

A compact disc containing codes and information describing a preferred embodiment of the present invention is submitted herewith and is hereby incorporated by reference. The compact disc contains the following files and/or programs:

| Title | Size in Bytes | Date of Creation |
|---|---|---|
| index.html | 15012 | 10/26/01 |
| wxportal_software.zip | 3592179 | 10/26/01 |
| DB_Spec.doc | 37888 | 10/26/01 |
| Event Logger.doc | 34304 | 10/26/01 |
| File Server External ReferenceSpecification.doc | 44032 | 10/26/01 |
| InstructionList Class Specification3.doc | 56320 | 10/26/01 |
| MessageSpec4.doc | 52224 | 10/26/01 |
| pqact.doc | 36864 | 10/26/01 |
| Process Server Specification.doc | 41984 | 10/26/01 |
| Web Server.doc | 41984 | 10/26/01 |
| WXPORTAL Configuration Requirements.doc | 32256 | 10/26/01 |
| WXPORTAL Design Overview.doc | 37888 | 10/26/01 |
| WXPORTAL Error Logging.doc | 42496 | 10/26/01 |
| WxPortal LDM design1.doc | 67072 | 10/26/01 |
| WxPortal phase 3.doc | 74240 | 10/26/01 |
| WXPORTAL Project Details.doc | 63488 | 10/26/01 |
| WxPortal_Arch.doc | 131584 | 10/26/01 |
| Animation.html | 397 | 10/26/01 |
| Arrows.html | 378 | 10/26/01 |
| Blk_Contours.html | 393 | 10/26/01 |
| Col_Contours.html | 397 | 10/26/01 |
| Derived.html | 421 | 10/26/01 |
| Ensemble.html | 418 | 10/26/01 |
| Graph.html | 334 | 10/26/01 |
| Graph_Data.html | 347 | 10/26/01 |
| Graph_Selection.html | 366 | 10/26/01 |
| Metars.html | 389 | 10/26/01 |
| Overlays.html | 383 | 10/26/01 |
| Postings.html | 379 | 10/26/01 |
| Streamlines.html | 388 | 10/26/01 |
| Thumbnails.html | 372 | 10/26/01 |
| WxPortal_DataTypes.html | 35574 | 10/26/01 |
| WxPortal_User_Interface.html | 44244 | 10/26/01 |
| 3D.png | 823 | 10/2/01 |
| ActiveE1.png | 15505 | 6/8/01 |
| AMS-Logo.jpg | 35091 | 9/27/01 |
| AMS-LogoSM.jpg | 11417 | 10/18/01 |
| Animated.gif | 2173291 | 10/23/01 |
| AnimationBar.png | 4161 | 10/2/01 |
| arrow_blue.gif | 68 | 10/23/01 |
| Arrows.png | 727 | 10/2/01 |
| Banner.jpg | 10412 | 10/18/01 |
| BG-Image.png | 1144 | 10/2/01 |
| Button-Feedback-DN.gif | 918 | 10/8/01 |
| Button-Feedback-ON.gif | 919 | 10/8/01 |
| Button-Feedback-UP.gif | 919 | 10/8/01 |
| Button-Help-DN.gif | 1085 | 10/4/01 |
| Button-Help-ON.gif | 1086 | 10/4/01 |
| Button-Help-UP.gif | 1086 | 10/4/01 |
| Button-News-DN.gif | 1130 | 10/4/01 |
| Button-News-ON.gif | 1131 | 10/4/01 |
| Button-News-UP.gif | 1131 | 10/4/01 |
| Button-Status-DN.gif | 1130 | 10/4/01 |
| Button-Status-ON.gif | 1131 | 10/4/01 |

-continued

| Title | Size in Bytes | Date of Creation |
|---|---|---|
| Button-Status-UP.gif | 1131 | 10/4/01 |
| Button-Support-DN.gif | 890 | 10/4/01 |
| Button-Support-ON.gif | 891 | 10/4/01 |
| Button-Support-UP.gif | 891 | 10/4/01 |
| Clear.png | 1548 | 10/2/01 |
| ConBlk.png | 847 | 10/2/01 |
| ConClr.png | 827 | 10/2/01 |
| ECP.png | 5641 | 10/2/01 |
| Ensemble-control-panel.gif | 32202 | 10/4/01 |
| FG-Image.png | 841 | 10/2/01 |
| Frustration.gif | 7298 | 1/5/01 |
| GetIElogo.gif | 3364 | 10/18/01 |
| GMT.png | 935 | 6/8/01 |
| graphics.jpg | 20505 | 10/4/01 |
| Help.png | 1485 | 10/2/01 |
| Help_Top.jpg | 13732 | 10/2/01 |
| HomePageBG.jpg | 93892 | 10/18/01 |
| HomePageBG.png | 39179 | 10/18/01 |
| leftarrow.png | 741 | 6/8/01 |
| leftbar.png | 804 | 6/8/01 |
| Login.gif | 2536 | 10/18/01 |
| logo_gea_31 × 50.gif | 556 | 10/22/01 |
| NewBase-10-9pm.jpg | 67706 | 10/9/01 |
| news_backg.gif | 99 | 10/18/01 |
| Overlays.png | 5539 | 10/2/01 |
| popup.gif | 6381 | 10/4/01 |
| Post.png | 758 | 10/2/01 |
| Print.png | 1629 | 10/2/01 |
| rightarrow.png | 764 | 6/8/01 |
| rightbar.png | 795 | 6/8/01 |
| ScreenShot.jpg | 43937 | 10/2/01 |
| spacer_clear.gif | 67 | 12/21/00 |
| stop.png | 386 | 6/8/01 |
| Strmlines.png | 1077 | 10/2/01 |
| Thumbs.db | 123392 | 10/18/01 |
| TimeCont.png | 1675 | 10/2/01 |
| Timeline.png | 7632 | 10/4/01 |
| Top2.jpg | 29665 | 10/22/01 |
| WeatherEye.png | 6875 | 10/11/01 |
| WS_FTP.LOG | 9824 | 10/19/01 |
| WxPortal_Arrows.png | 368289 | 10/26/01 |
| WxPortal_BlkContour.png | 243224 | 10/26/01 |
| WxPortal_ColContour.png | 338767 | 10/26/01 |
| WxPortal_Derived.gif | 302739 | 10/26/01 |
| WxPortal_ECP.png | 646047 | 10/26/01 |
| WxPortal_Grph.png | 16943 | 10/26/01 |
| WxPortal_GrphData.png | 5186 | 10/26/01 |
| WxPortal_GrphSel.png | 51113 | 10/26/01 |
| WxPortal_Metars.png | 213932 | 10/26/01 |
| WxPortal_Overlays.gif | 251892 | 10/26/01 |
| WxPortal_Postings.png | 226517 | 10/26/01 |
| WxPortal_Streamlines.png | 275297 | 10/26/01 |
| WxPortal_Thumnail_1.png | 172895 | 10/26/01 |
| WxPortal-Thumb.png | 7196 | 6/7/01 |
| WxPortal-Thumb-controls.png | 1551 | 6/7/01 |
| ZoneSel.png | 5648 | 10/2/01 |
| WxPortal_Derived1.png | 195852 | 10/26/01 |
| WxPortal_Derived2.png | 194981 | 10/26/01 |
| WxPortal_Derived3.png | 194547 | 10/26/01 |
| WxPortal_Derived4.png | 193974 | 10/26/01 |
| WxPortal_Derived5.png | 190291 | 10/26/01 |
| WxPortal_Derived6.png | 191379 | 10/26/01 |
| WxPortal_Derived7.png | 194307 | 10/26/01 |
| WxPortal_Derived8.png | 192120 | 10/26/01 |
| WxPortal_Derived9.png | 193829 | 10/26/01 |
| WxPortal_Overlays.png | 246941 | 10/25/01 |
| WxPortal_Overlays_Counties.png | 192940 | 10/25/01 |
| WxPortal_Overlays_Highways.png | 176290 | 10/25/01 |
| WxPortal_Overlays_States.png | 179058 | 10/25/01 |
| WxPortal_Overlays_Water.png | 174759 | 10/25/01 |

FIELD OF THE INVENTION

The present invention relates generally to data processing systems for monitoring and presenting weather-related information. More specifically, the present invention relates to a system for selectively assembling and presenting a wide range of meteorological or weather-related information on an Internet browser via an interactive user interface, wherein the information is image or graphical in content and is normalized with respect to time and wherein the states of an overlayed presentation can be saved for future recall.

BACKGROUND OF THE INVENTION

Approximately one seventh of the U.S. gross national product is weather sensitive, yet businesses lack adequate weather planning and analysis tools to make accurate short-term and long-range economic decisions. The National Weather Service data stream, which until recently was only available from a handful of companies with very restrictive and expensive redistribution policies, is now available via the NOAAPORT satellite feed. The massive flow of data is useless to decision makers without the ability to transform it into quantities relevant to their operations and visualize the data as useful information.

Weather forecasting technology and data volumes are increasing at a rapid pace. The trend is clearly toward improved forecast models and the availability of additional models, higher resolution models (made practical due to faster computers and decreasing computing costs) with huge increases in the resulting model output data, and additional satellite data sources with new and higher resolution images. Current approaches to weather decision support typically require direct participation or consulting by trained meteorologists and are expensive, piecemeal and chaotic—unable to correlate the variety of weather information sources that are needed for business decisions. Even professional meteorologists increasingly need tools to deal with the growing complexity and volume of the available data.

There are a wide variety of tools meteorologists currently use for their weather forecasting and tracking needs. For example, there are several "storm tracker" systems available that use real-time data to chart the progress of a storm in terms of intensity, precipitation, movement, and direction as shown in U.S. Pat. Nos. 5,717,589, 6,018,699, 6,275,774, 6,125,328, 6,339,747, and 6,401,039. U.S. Pat. No. 6,351,218 shows the use of such mapped storm track data as part of a system for activating weather-warning sirens.

Three-dimensional presentation of real-time radar weather information is well known and described, for example, in U.S. Pat. Nos. 5,379,215, 5,583,972 and 6,266,063. Examples of weather simulation systems that generate simulated three-dimensional "out-the-window" photographic-like representations of predicted weather data at a given location are shown in U.S. Pat. Nos. 5,409,379, 5,480,305 and 5,630,718. U.S. Pat. No. 6,052,648 combines a real-time three-dimensional weather representation with a video image of a weather forecaster for television weather broadcasts. Examples of weather information systems that utilize digital camera and video images of local areas to make measurements of and/or disseminate real time weather observations are shown in U.S. Pat. Nos. 6,208,938 and 6,269,309.

Examples of selective audio playback and alphanumeric and chart-type displays of weather information from different weather reporting stations are shown in U.S. Pat. Nos. 5,568,385 and 5,848,378. U.S. Pat. No. 5,517,193 shows an example of a weather information processing system that present different types of weather data in different windows within a graphical user interface. A system for distributing graphic and audio weather information to a local user over a cell phone is described in U.S. Pat. No. 6,343,255. U.S. Pat. No. 5,848,378 describes a system for collecting and disseminating weather information as audio information over the phone or as alphanumeric data values over the Internet. U.S. Pat. Nos. 6,356,843 and 6,405,134 describe examples of systems that are used to graphically display one particular kind of weather data, such as lightening data or wind shear data.

Examples of systems that utilize commercially available sources of forecast weather data to assist in business decision-making are shown in U.S. Pat. Nos. 5,491,629, 5,521,813, 5,796,932, 6,397,163 and 6,442,554. U.S. Pat. No. 6,298,307 describes a weather forecasting system that attempts to use the best model to make a forecast for a selected location based on a time until an activity.

While all of these systems provide helpful ways of receiving and utilizing weather information, almost all of these systems offer little control to the end-user as to how the weather information will be organized and presented. One of the reasons for this is the challenge that is encountered when trying to simultaneously present multiple sources or types of weather data. In addition to the inherent problems in trying to collate different types of data in different formats from different providers, none of the real time weather data sources provide weather information updates on a common time basis. For example, most radar data is provided continuously in real time or with a delay of few minutes, whereas meteorological readings such as temperature, wind, precipitation, humidity and the like are provided on periodic intervals, such as every hour or every quarter hour or even daily.

Even in the context of presenting the same type of weather information, such as radar data, the problem of lack of a common time frame for the weather data still presents a challenging problem. U.S. Pat. No. 6,266,063 recognizes the problems of attempting to combine weather radar data from different radar sources that have different refresh periods. In this patent, NEXRAD radar information that is updated only once every five to six minutes is combined with continuous real time Doppler radar images by setting a heartbeat interval for updating the timing of presentation of video images for a television weather forecast. The heartbeat interval of this system is essentially a least common denominator that is set at a period of once every five minutes. In this way, both sets of radar information can be simultaneously displayed in a common time frame, but that time frame is limited to the update resolution of the slowest updating information source.

U.S. Pat. No. 6,360,172 presents a system for customizing natural phenomenological information to an end user's (subscriber's) specifications and needs by gathering raw data from several different sources, such as weather radar, NWS, and NOAA and synthesizing the information into something that can be transmitted to the user. The user must specify what types of weather measurements (what geographic area, precipitation, wind speed, temperature, etc) and also what form of transmissions are desired. For instance, if the user's device is a telephone voice mail, the transmission will be in the form of a spoken text message. If the device is a pager or PDA, the transmission will be text receivable on the device. his is accomplished by filtering all the raw weather data by the users' specifications and only presenting the information desired in a personal text message format on the media desired. While this invention is effective in presenting information from many different meteorological data sources as text data, there is no capability for handling graphical meteorological information.

While existing systems and techniques for presenting and combining weather-related information are adequate for well-defined applications where there is little need for user-based customization or manipulation of the weather-related information, there is a continuing need for better tools and techniques for the presentation and combination of weather-related information and especially graphical meteorological information.

SUMMARY OF THE INVENTION

The present invention is a system for presenting meteorological information using a browser interface that accesses massive amounts of weather-related data in the form of images stored on the server-side of the system. A user having a common browser on a Web client can access the server-side information to selectively assemble weather-related data on multiple overlays of images and/or graphics into one simultaneous presentation on a Web page. The different overlays are normalized with respect to time and space, and a user can separately generate graphically miniaturized presentations of weather-related data for saving and subsequently recalling each presentation, wherein each presentation is displayed with current relativized data. The user can also select or customize derived variables to be distinctively displayed as part of a presentation.

In operation of a preferred embodiment, the weather portal system provides a method for presenting weather-related information that receives weather-related data from a plurality of sources. At lest two of the sources have a different time base for weather-related data associated with those sources. The weather-related data is processed and stored as part of at least one server-side database. An Internet site accessible by a Web browser responds to a user request via the Web browser, and graphically presents selective weather-related data stored in the at least one database such that multiple image sequences of weather data from at least two sources are simultaneously overlain using a normalized time scale., A dynamic graphical representation of the normalized time scale is also presented to the user along with the multiple image sequences.

In another preferred embodiment, the weather portal system provides a method for presenting weather-related information that receives a plurality of weather-related data products. Each product has a predetermined time interval for collecting weather-related data associated with that product. The weather-related data is processed and stored as part of at least one server-side database. An Internet site accessible by a Web browser enables a user to selectively create a gallery of at least one separately generated, graphically miniaturized presentation of weather-related data that can be saved and subsequently recalled. When recalled by the user on a subsequent request, a presentation of current data is displayed using the selection and arrangements of images from the saved presentation.

In another preferred embodiment, the weather portal system provides a method for presenting weather-related information that receives a plurality of weather-related data products. Each product has a predetermined time interval for collecting weather-related data associated with that product. The weather-related data is processed and stored as part of at least one server-side database. At least one selected derived variable is created and also stored as part of the at least one database. An Internet site accessible by a Web browser responds to a user request via the Web browser by graphically presenting weather-related data stored in the at least one database, whereby multiple image sequences of weather data from at least one product and a derived variable are simultaneously overlain using a normalized time scale, and wherein the derived variable weather-related data is visually distinguishable from weather-related data of the at least one product. Preferably, at least two products and at least one derived variable are simultaneously overlain.

DETAILED DESCRIPTION OF THE PREFERRED EMBODIMENT

Overview

The preferred embodiment relates to a system presenting meteorological information using a browser interface in accordance with the present invention. The meteorological information presentation system or weather portal system enables a user to selectively assemble overlays or layers of weather-related data in the form of graphics and/or images for viewing historical, real-time, and/or forecast weather information. The system rapidly assimilates a myriad of weather-related data from several sources and rapidly integrates user selectively requested information into customized, graphically-detailed, animated images on a Web page using commercially available computers running standard Web browser software.

Figure 1:
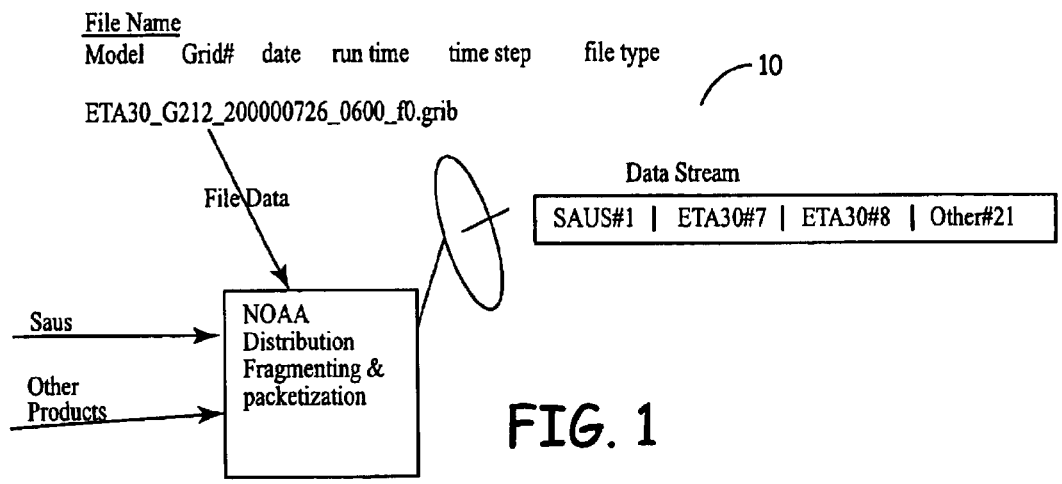
FIG. 1 is an overview of a NOAA site broadcasting weather-related data.
Figure 2:
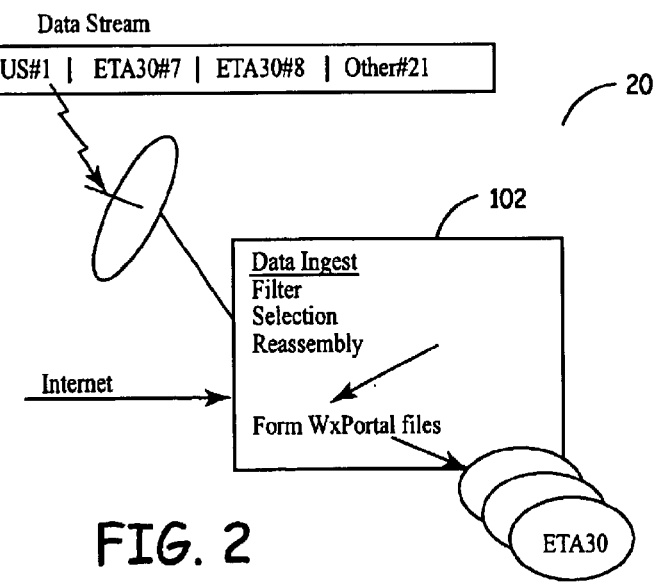
FIG. 2 is an overview of the weather portal receiving weather-related data.

As shown in FIGS. 1 and 2, data flows begin with originating NOAA or other weather data gathering sites, which may be up-linked to geo-stationary satellites to broadcast information streams thereto 10, or may be connected to the Internet. NOAA data is transmitted from the originating NOAA site in "packets" of information. A packet can belong to any of numerous products. An example of a product is the output of the ETA meteorological model for a given time of day and a specific time step for that model run. These products are often transmitted or broadcast at the same time, so that their packets are intermingled. Thus, the packets of the separate data products must be recognized and reassembled into usable files. This process is controlled by a receiver's parameters that define which products are desirable and what naming convention is to be used to store the data in locally stored files 20.

Figure 3:
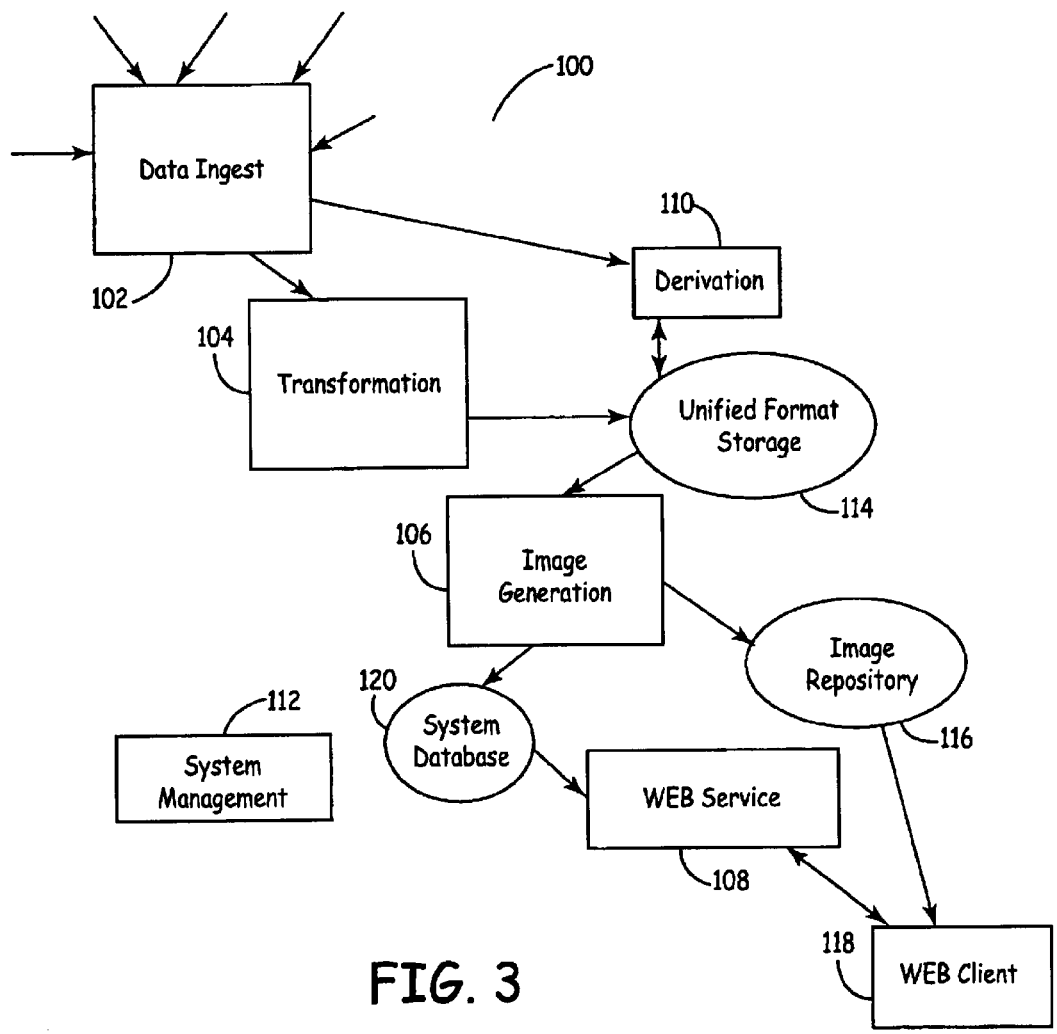
FIG. 3 is an overview of the weather portal system.

The weather portal system is a novel configuration of computer hardware and software components. As shown in FIG. 3, the weather portal system 100 comprises a data acquisition and validation component 102, a data transformation component 104, an image generation component 106, a Web service component 108, a derivation component 110, a system management component 112, a unified format storage component 114, an image repository 116, a Web client component 118, and a system database component 120. The data acquisition and validation component 102 is an adaptation of the Local Data Manager System (LDM) developed by the University Consortium for Atmospheric Research (UCAR). This element ingests weather and weather-decision related data from many resources broadcasting via satellite and/or Internet transmission as well as other forms of digital storage such as local data archives of GIS and historical weather records. The data gathered will range from real-time information such as NEXRAD radar and satellite images to the current output of computer models to data archives of GIS and historical weather records. The data transformation component 104 is a technology that maps all data products into a common geophysical and temporal data storage system MeRAF (MeRAF is a software system encapsulating the netCDF software system, developed by Unidata Program Center in Boulder, Colo., into a multidimensional array with time as one of the dimensions). The image generation component 106 embodies technologies for creating two and three PNG (a public domain graphics standard) images utilizing the saviWIN component of the SSESCO Environmental Workbench (saviWIN is one component of the Environmental Workbench that performs the graphical computations, transformations, and rendering of three dimensional images; the Environmental Workbench was developed by SSESCO, Inc., located in St. Paul, Minn.). The Web service component 108 employs industry standard components such as the Apache Web Server and PHP and embodies technologies to create and deliver essential HTML pages, images, and control information to the Web client. The derivation component 110 employs technologies to create new data values from data, formulas, tables, and algorithms that are stored in the unified MeRAF data storage system. The technology that drives the weather portal allows a user to add derived, or combination, weather variables based on the user's needs. Not only can the weather portal system create specific derived variables, it can further customize them by data grouping, coloring, and XY graph depiction. The system management component 112 employs technologies to provide platform independent operation of the weather portal system where multiple hardware components and software processes interact in both asynchronous (event-driven) and synchronous (time-driven) behaviors. The core of this component is the unique adaptation of computer industry standard inter-processor communications (RPC or remote procedure calls) with a new and novel language IL (Instruction List language was developed by SSESCO, Inc. for managing asynchronous processes operating on a number of independent computing platforms and responding to unscheduled outside events such as the arrival of satellite transmitted data streams) for describing resource and time dependencies for processing. The unified format storage component 114 embodies technologies of the SSESCO MeRAF file scheme and associated management and manipulation tools. The image repository 116 is a system for storing, retrieving, and managing massive numbers (500,000 to 2,000,000) of image files. The Web client component 118 uses a technology delivered over an Internet connection to a computer industry standard Web browser such as Microsoft Internet Explorer I the form of HTML and JAVASCRIPT formulations that present a fully interactive weather workstation to the user. Finally, the system database component 120 is a system employing a widely used public-domain database (MYSQL) to manage the information related to image files, user state, and licensing.

The Web Browser User Interface

The weather portal's unique Web browser user interface allows users to visualize weather-related data unified in time and space. Presently, there may be as many as 4 million weather portal map images online at anytime, although those skilled in the art are aware that this number is conceptually unlimited depending on memory and computational power, and presently nearly 500,000 new map images are generated each day. All the images are displayable through a common interface onto a single Web page. Users no longer need to click on link after link to find sought after information. This weather-related data assembly is orchestrated when users access an ensemble control panel to select data streams for up to eight layers of data image visualization.

Figure 4:
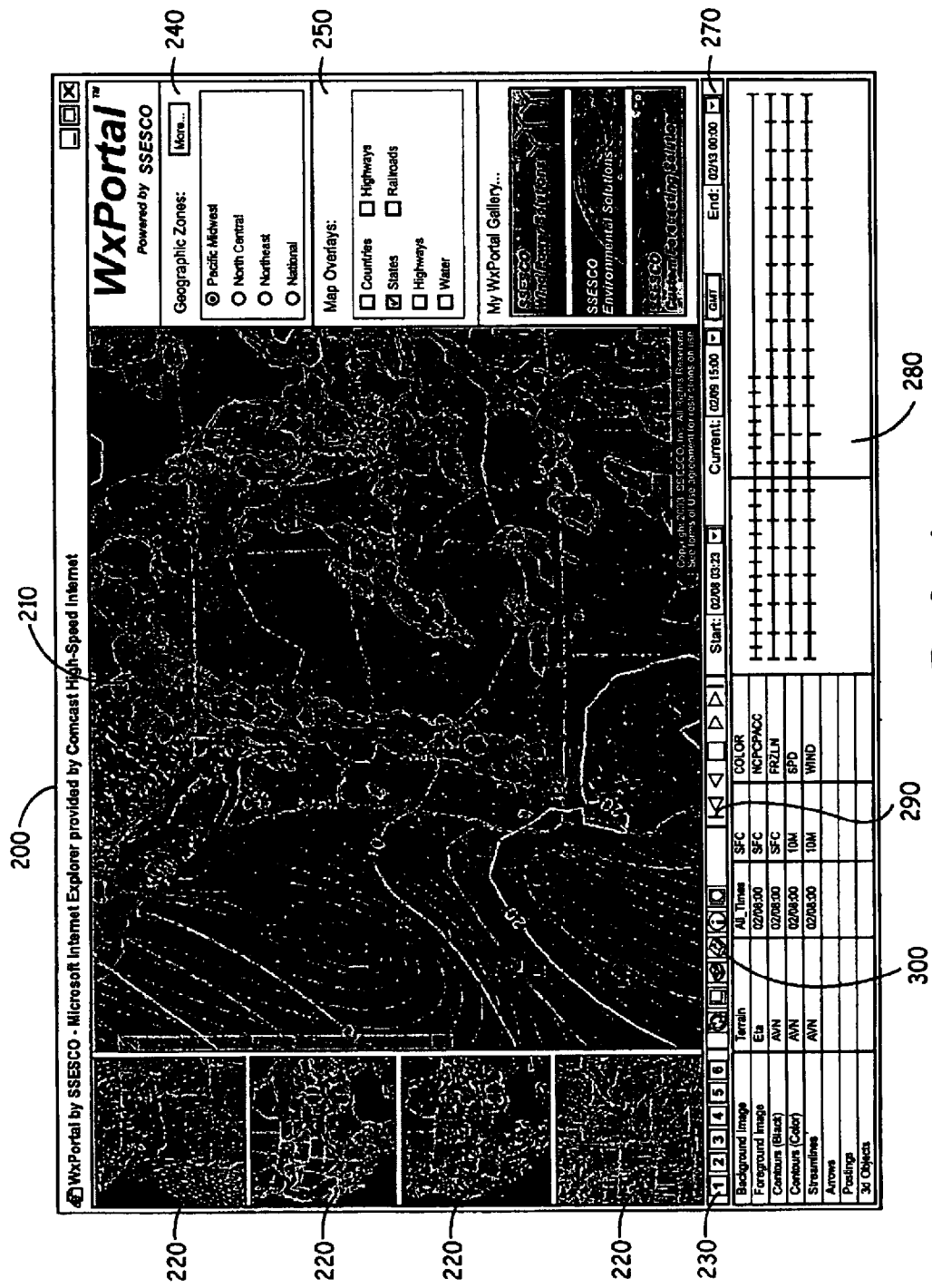
FIG. 4 is a view of the Web browser user interface.
Figure 5:
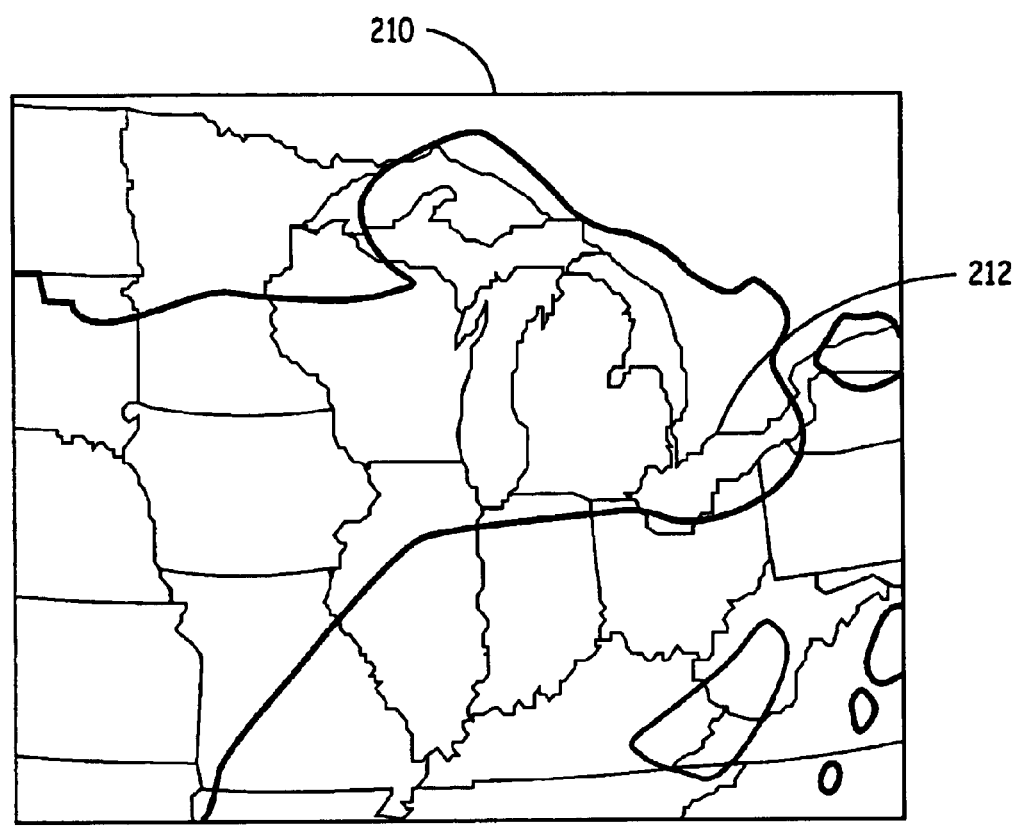
FIG. 5 is a view of the main graphics display area of the user interface.

As shown in FIG. 4, the weather portal's Web browser user interface 200 comprises a main graphics display area 210, four thumbnail windows 220, a gallery control button panel 230, a geographic zone selector panel 240, a map overlays panel 250, a weather portal ensemble control panel 260, weather portal time control menus 270, a timeline display 280, weather portal animation control panel 290, and weather portal utility panel 300. As shown in FIGS. 4 and 5, the main graphics display area 210 is used to present the main graphics display 212 derived from requested graphical images of weather-related data stored in the at least one server-side database. To create the main graphics display 212, multiple image sequences of weather-related data from at least two products are simultaneously overlain in the main graphics display area 210 using a normalized time scale. Presently a maximum of eight layers of information, more fully described later, can be viewed at any time. The layers are organized by their graphical attributes. For example, Background Images, such as satellite images, are opaque and thus are on the bottom of the "stack" of map overlays. Foreground Images, which have some transparency (i.e. the background image can be seen behind them), black-and-white and colored contour lines displaying variables such as temperature or humidity, streamlines showing wind direction and possibly the general flow of a weather pattern at various levels in the atmosphere, arrows showing "wind barbs" (depicting wind speed and direction), and postings showing point specific data (e.g., temperature at an airport "Metar" location) can all be overlaid on the background images. The 3D Objects layer shows 3D isosurfaces of upper air level features, which layer may be opaque or transparent.

Figure 6:
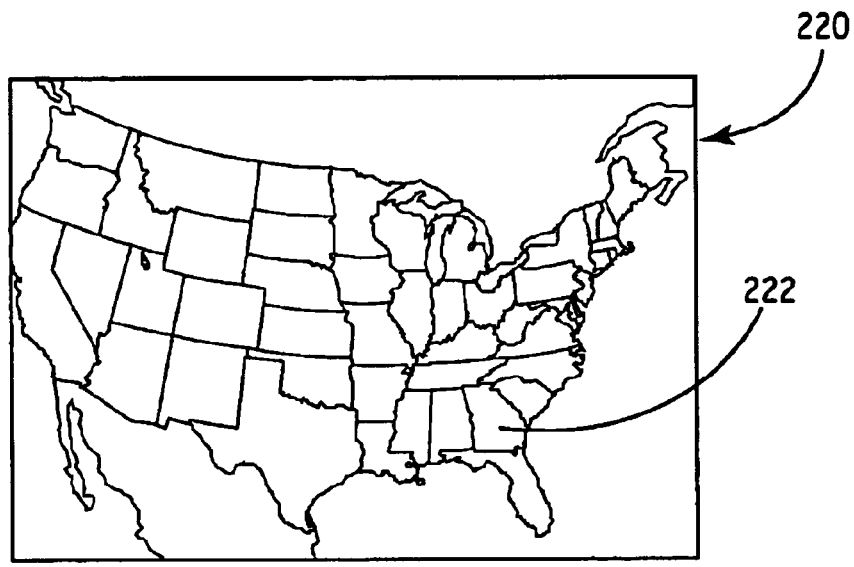
FIG. 6 is a view of an exemplary thumbnail of the user interface.

As shown in FIGS. 4 and 6, the thumbnail windows 220 enable a user to quickly store and recall weather data scenarios and data overlay combinations and other user selected or default states. The preferred embodiment can store six sets of four thumbnails 222, although those skilled in the art are aware that other combinations are possible. To create a thumbnail 222, the user selectively clicks down on and drags the main graphics display 212 to a thumbnail window 220 where the user wishes to store the main graphics display 212. A dialog box automatically opens and prompts the user to enter a name and/or description to identify the thumbnail 222. Letters and/or numbers can be entered, which text will be visible to the user as a "tool tip" when the user hovers a cursor over the thumbnail 222. To recall a thumbnail 222 to the main graphical display area 210, the user should first verify that the selected thumbnail 222 pertains to a currently active zone (described below). By double-clicking on the selected thumbnail 222, the user communicates the overlay combination from the thumbnail window 220 to the main graphics display area 210. The newly selected main graphics display will be presented with current relativized weather data. To delete a thumbnail 222, all map overlay panel 250 options (states, counties, highways, and water) are cleared, which should render a blank main graphics display area 210. The user then clicks down on the blank main graphics display 212 and drags it over the appropriate thumbnail window 220.

Figure 7:
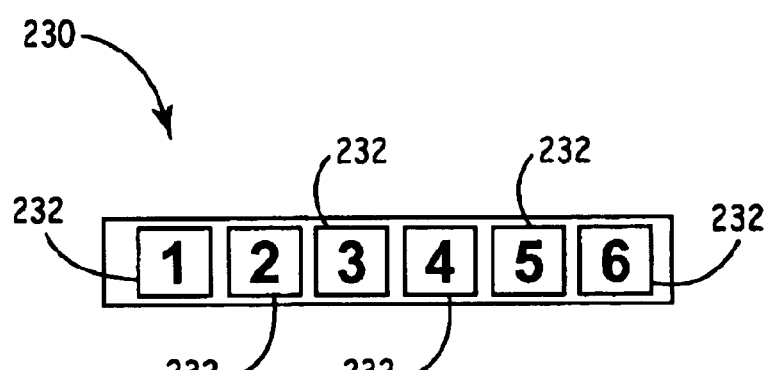
FIG. 7 is a view of the gallery control buttons of the user interface.

As shown in FIGS. 4 and 7, using the gallery control button panel 230, six sets of four thumbnails 222 (a total of 24) can be stored as a gallery holding data overlay combinations and other user selected or defaulted states. Left clicking on one of the numbered gallery control buttons 1 through 6 232 recalls and displays the four corresponding thumbnails 222 on the Web browser user interface 200 in place of the previously displayed set of thumbnails 222, and the gallery control button 232 for the currently presented set appears depressed (as the number 1 is in FIG. 7). Thumbnails 222 within each set are displayed in the order in which they were originally juxtapositioned. The gallery lets a user quickly save and recall his or her overlay combination weather "favorites" so that they do not have to be recreated each time the weather portal is used.

Figure 8:
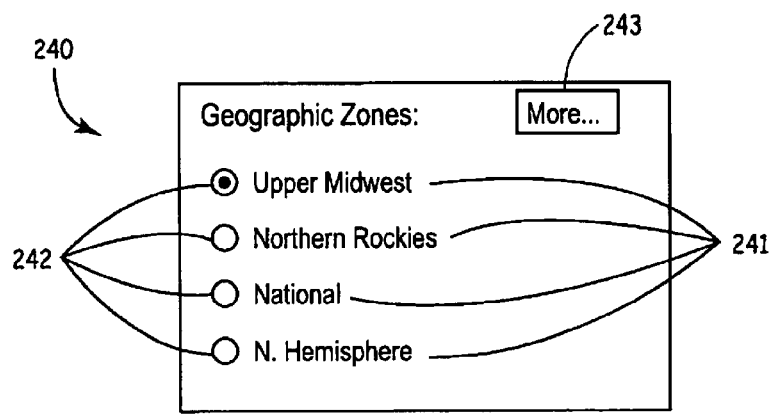
FIG. 8 is a view of the geographic zone selector panel of the user interface.
Figure 8A:
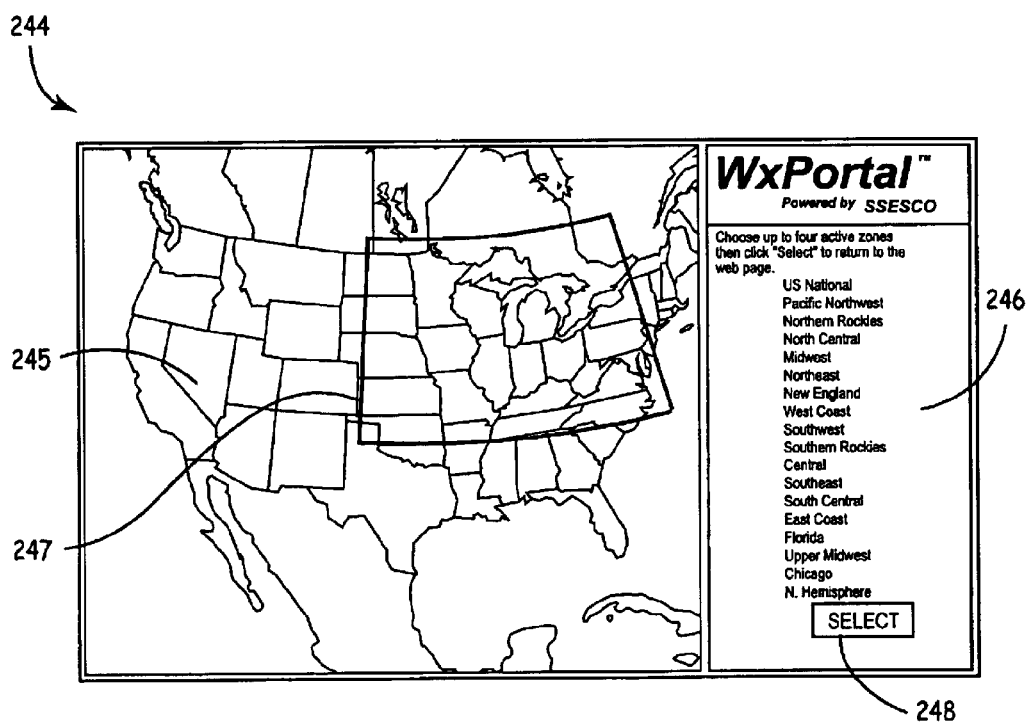
FIG. 8A is a view of the zone selector window of the user interface.

As shown in FIGS. 4 and 8, the geographic zone selector panel 240 allows a user to choose as many as four active zones 241, or active geographic regions, for which weather-related data can currently be presented on the main graphics display area 210. Those skilled in the art are aware that a larger or smaller number of active zones could be configured and that the definition of any zone can be arbitrarily redefined, and custom zones can be defined to meet the user's needs. The four active zones 241 are listed in the zone selector panel 240 with a radio button 242 next to each for selectively displaying the active zone on the main graphics display area 210 and/or selectively changing the currently displayed active zone. Clicking on the More button 243 opens a zone selector window 244, as shown in FIG. 8A. The zone selector window 244 includes a map 245 inclusive of all possible active zones and a list 246 of all possible active zones. A zone can be selected as an active zone or deselected as an active zone either by clicking on a location on the map or by clicking on the name of the zone in the list. Selected zones are displayed in a color distinct from the remainder of the list. Placing a cursor over a location on the map will highlight the corresponding zone name in the list and a zone outline 247 will overlay the map to indicate the zone being considered. A warning message (not shown) will appear if the user tries to select more than four active zones. Pressing the Select button 248 finalizes the selection of active zones and returns the user to the Web browser user interface 200 reloaded with new current weather-related data based on the final selection of active zones, and the selected zones will appear in the geographic zones panel 240.

Figure 9:
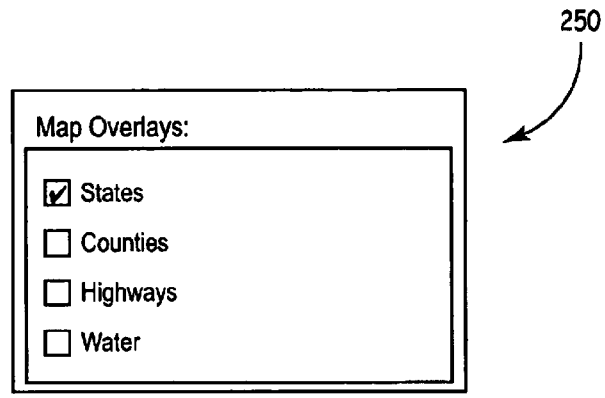
FIG. 9 is a view of the map overlays pane of the user interface.

As shown in FIGS. 4 and 9, the map overlays panel 250 allows a user to selectively display reference map overlays such as political boundaries, roads, and water features. The system can also create and maintain user selected custom overlays, such as facility maps showing buildings, pipelines, towers, roads, and other features. The custom overlays can be generated for any geographic zone specified by the user. To do so, the user provides the system with industry standard GIS data files such as "shape" files or ARCinfo files, which the system then processes like other product files and stores in the server-side image database.

Figure 10:
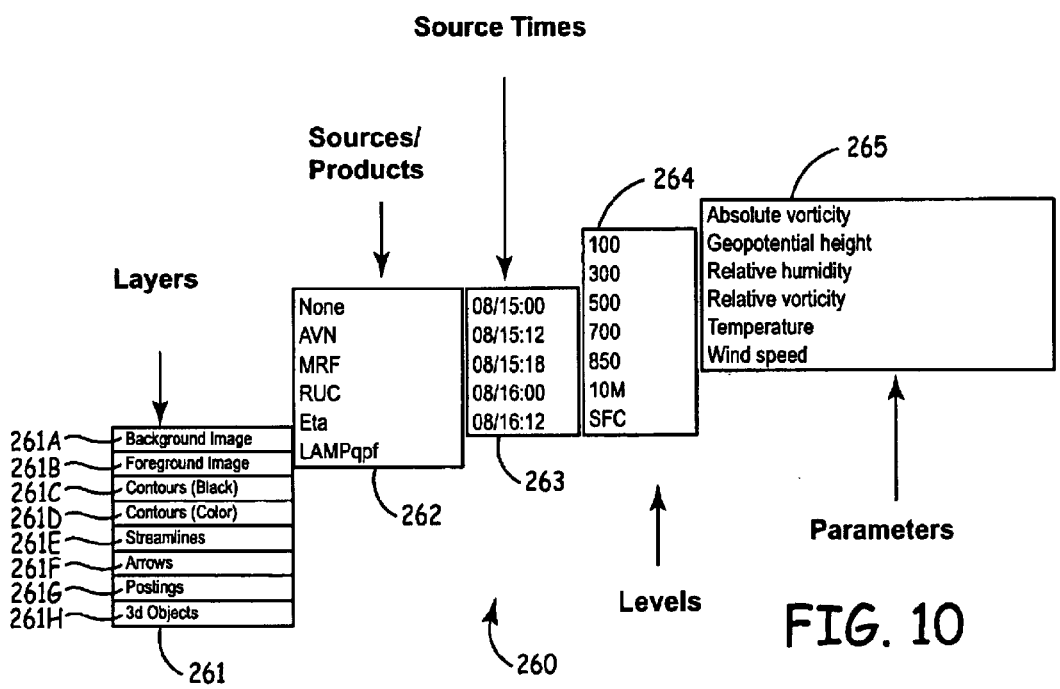
FIG. 10 is a view of the ensemble control panel of the user interface.

As shown in FIGS. 4 and 10, on the left side of the user interface is the ensemble control panel 260 having eight buttons arranged vertically. Each of these eight buttons represents a type of graphical weather-related map data that can be displayed on the main graphics display area 210. Clicking on these buttons enables a series of cascading and hierarchical menus to appear, invoked working from left to right across a monitor. The main menu and the cascading menus comprise five levels. The main menu 261 displays various kinds of weather-related data layers or overlays, the first cascading menu 262 displays various kinds of products and sources, the second cascading menu 263 displays various source times, the third cascading menu 264 displays various atmospheric pressure levels or surface levels, and the fourth cascading menu 265 displays various data parameters. For example, a user might select "Contours (Black)", then choose a source of forecast model data (Eta), then pick the source time (08/16:12), select the atmospheric pressure level (850 mb) or surface level, and finally select the weather variable (Wind speed) to display. After selecting the final option, the menus disappear and user's choices are displayed in the ensemble control panel 260 area. To make changes to selections, the user can click on any item listed on the panel to change products or sources, times, pressure levels, variables, etc. With respect to the main menu, the Background Image button 261A allows the user to select the backdrop upon which all other weather data will be displayed. The Foreground Image button 261B lets the user select the weather data the user wishes to display as a Foreground Image. The Contours (Black) 261C lets the user select the weather data the user wishes to display as black contour lines. The Contours (Color) 261D lets the user select the weather data the user wishes to display as colored contour lines. The "Streamlines" option 261E lets the user select graphical displays of weather data shown as streamline data elements. The Arrows option 261F lets the user display wind speed and direction. The "Postings" option 261G lets the user select numerical displays of weather data shown as point specific data elements, for example, the daily high temperature at Chicago's O'Hare airport. Finally, the "3D Objects" option 261H lets the user display 3D rendered variables such as cloud cover, jet streams, etc.

Figure 11:
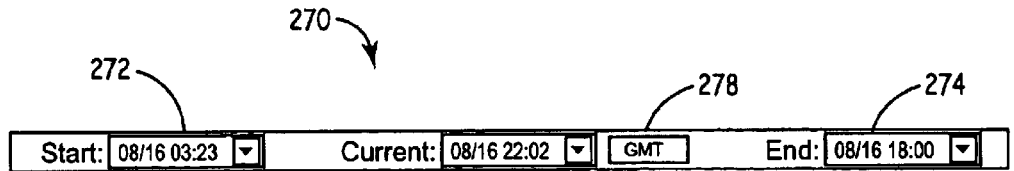
FIG. 11 is a view of the time control menus of the user interface.

As shown in FIGS. 4 and 11, the weather portal time control menus 270 are pull-down menus allowing the user to set a time interval for which weather-related data sequences are presented. The start menu 272 is used to select the start time of a sequence, the end menu 274 is used to select the end time of the sequence, and the current menu 276 in the center 270 displays the time for the weather-related data currently being presented. The current menu allows the user to change the currently displayed time frame and corresponding image, as will clicking down on and dragging the red hairline in the timescale display. The GMT button 278 toggles the currently displayed time between Greenwich Mean Time (GMT) and local time.

Figure 12:
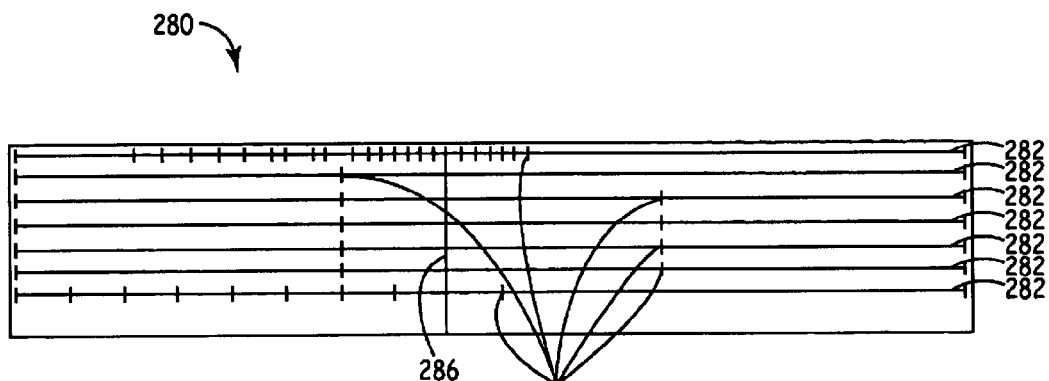
FIG. 12 is a view of the timeline display of the user interface.

As shown in FIGS. 4 and 12, the timeline display 280 graphically displays the frequency or time intervals with which product data is captured. For example, some data such as satellite or radar images are recorded as frequently as every few minutes while data from forecast models may be recorded hourly, daily, or even less frequently. The timeline display 280 includes eight timelines 282, each representing a different data overlay or layer and having tick marks 284 to delineate the time at which data was captured. Each timeline 282 is normalized with respect to the other timelines 282 and the start to end time interval 270. The currently presented image on the main graphics display area 210 can then be indicated on the timeline display by a dynamic, repositionable red vertical hairline 286, i.e., by observing the interval on each timeline 282 through which the line 286 currently passes. When a cursor is allowed to hover over the red hairline 286, a special cursor will appear (not shown) indicating that the user can click down and drag the red hairline 286 to change the currently presented image. Dragging the hairline 286 also correspondingly changes the date and time displayed in the current menu 276. When the timeline display 280 is set to display future data such as from predictive models, some data types such as radar and actual temperatures are not available in the timeline display 280, since they have not occurred yet.

Figure 13:
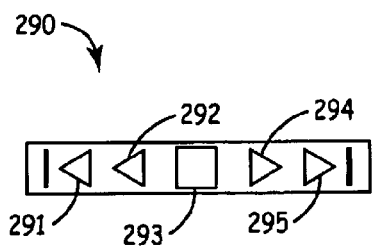
FIG. 13 is a view of the animation control buttons of the user interface.
Figure 14:
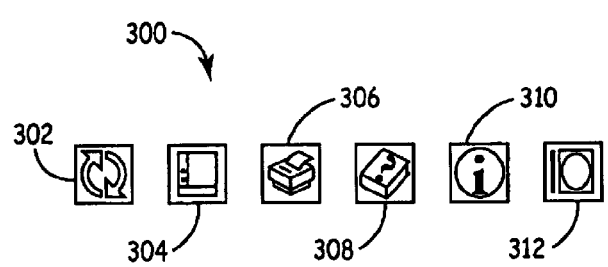
FIG. 14 is a view of the utility buttons of the user interface.

As shown in FIGS. 4 and 13, the animation control panel 290 allows the user to control a presentation graphical weather-related data over a time sequence. Clicking on the "i" button 310, shown in FIG. 14 sets the animation rate. The animation rate is the same for forward and backward animation and must be a positive number. Animation rate is dependent on a number of factors. The first time a sequence of time steps is animated, the Web client browser will fetch each image and add it to its accessible cache. Preferably the client browser is set-up to use cache (Temporary Internet Files option under Microsoft Tools menu. Thus, initial animation speed is dependent on the speed of the Internet connection. Subsequent animation will use the cached images and the animation rate will attempt to follow the user selected animation rate. Still, the animation rate may be affected by the number of layers being animating, the speed and available memory of the client computer's graphics card, etc. The user can also choose the amount of delay (dwell time) at the end of an animation loop. This is helpful when the user is trying to analyze a sequence of images for weather trends. The amount of delay will be effected at either the beginning or end of a sequence, depending on whether a forward or backward animation is selected.

Click once with the left mouse button to activate each animation control button as follows: The left arrow with vertical bar button 291 moves the user back one frame. The left arrow button 292 starts playing a loop of images progressing frame by frame backward in time until the Stop button is clicked (when all the frames have been displayed, the sequence loops back to the beginning). The Stop button 293 stops the animation sequence. The right button 294 arrow starts playing a loop of images progressing frame by frame forward in time until the Stop button is clicked (when all the frames have been displayed, the sequence loops back to the beginning). The right arrow with vertical bar button 295 moves the user forward one frame. The "GMT" button 278 toggles the time readout between GMT (Greenwich Mean Time) and local time displays.

Figure 15:
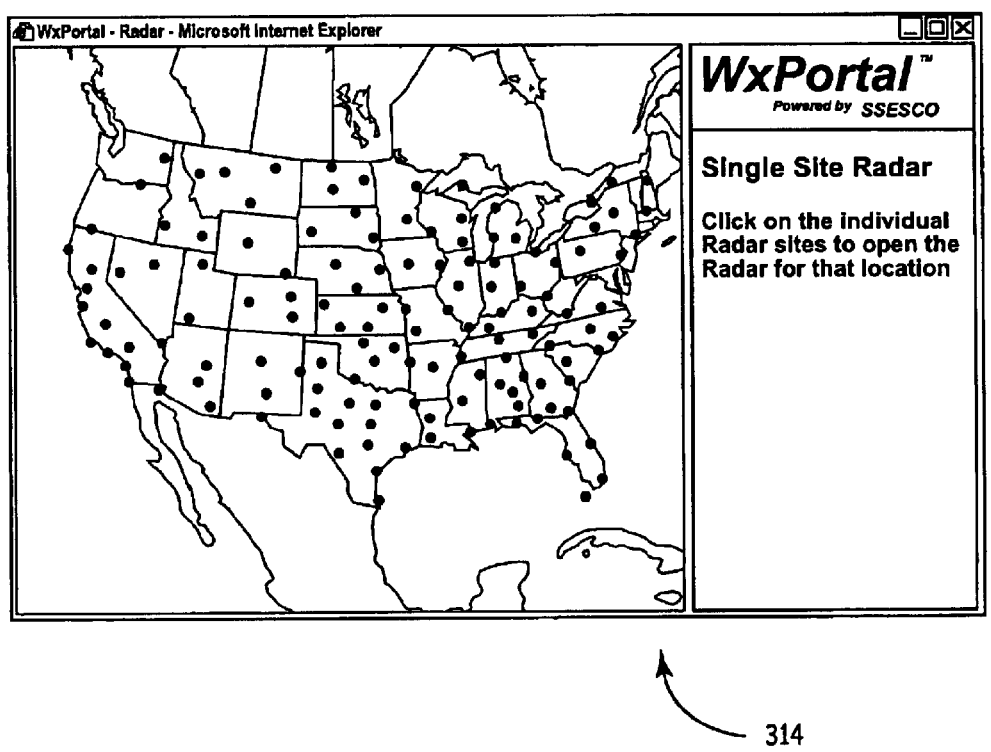
FIG. 15 is a view of the Nexrad selector page.

The weather portal has six utilities. Pressing the button with two arrows 302 refreshes the weather overlays currently displayed. Newly available data is added to the timeline. Pressing the button with the user interface symbol 304 turns off all weather data overlays currently displayed in the main graphics window. Pressing the button with the printer symbol 306 opens another browser window and lets the user print the weather data displayed in the main graphics window. Pressing the button with the book symbol 308 opens another browser window and brings the user to this page. Pressing the button with the "i" symbol 310 opens a dialog box (not shown) where the user can set user preferences. Currently the user can set the animation speed and the amount of pause time at the end of an animation loop. Pressing the remaining button 312 opens the single site NEXRAD radar selector window, as shown in FIG. 15. The Nexrad selector page 314 allows the user to select National Weather Service NEXRAD sites by clicking on the map locations for each reporting station. Placing a cursor over the map location will display the station name before being selected.

Detailed Description of the Timeline Display and Time Controls Menus

Presentation and control of time-based images on the main graphics display area requires management of massive amounts of data with respect to a multiplicity of times, time intervals (time between image displays), and time spans (total number of time steps to be displayed). For each of the user selections described above, there may be tens or even hundreds of different images representing a distinct time step that may be displayed or animated. Presently, a user may have interactive access to as many as 400,000 or more different images for each of the active zones. The system must be capable processing and communicating this massive amount of information quickly to provide a true user interactive look and feel, and a browser resident on a Web client should possess all the information with respect to what products/sources, source times, levels, parameters, and time-steps are available at that moment. Fulfilling these needs could involve raw data transfers of from 1 to 16 megabytes of data between the Web server and the Web client browser, which is an unacceptable network burden.

The preferred embodiment solves the problem of managing dynamic graphical presentations of time relationships among image displays by creating a normalized timeline that includes time tick marks and a dynamic, repositionable hairline. As shown in FIG. 12 and described above, a horizontal timeline is associated with each ensemble layer or overlay. Vertical tick marks on each timeline denote the availability of an image at the corresponding time. Even when data for a source or product may be captured at a predetermined interval, tick marks for a timeline may not be evenly distributed, for it is possible that an image from a sequence may be missing due to upstream data omissions, in which case the corresponding tick mark is absent. The red vertical hairline indicates the current time being displayed. This hairline can be selectively dragged by the user to any position along the timeline display to reset the current time. Alternatively, current time can be advanced or backed up using the current time menu or the animation control buttons.

All selected image sequences for a current time are displayed. If an overlay does not possess a timestamp coincident with the time shown on the current time menu, the image for the closest previous time, as indicated by the nearest tick mark to the left of the hairline, is chosen for display. In certain cases, images will not be displayed if the nearest time available exceeds an arbitrarily predetermined "stale image" period, so that the risk of making inappropriate correlations from information in different layers of presentation is reduced. The timeline display is regenerated each time a new selection is made on the ensemble control panel main or cascading menus. The visual span of the timeline display also is reevaluated and recomputed considering the most recent user selections, which is used to normalize the timelines, and new start and stop default times are established.

Figure 16:
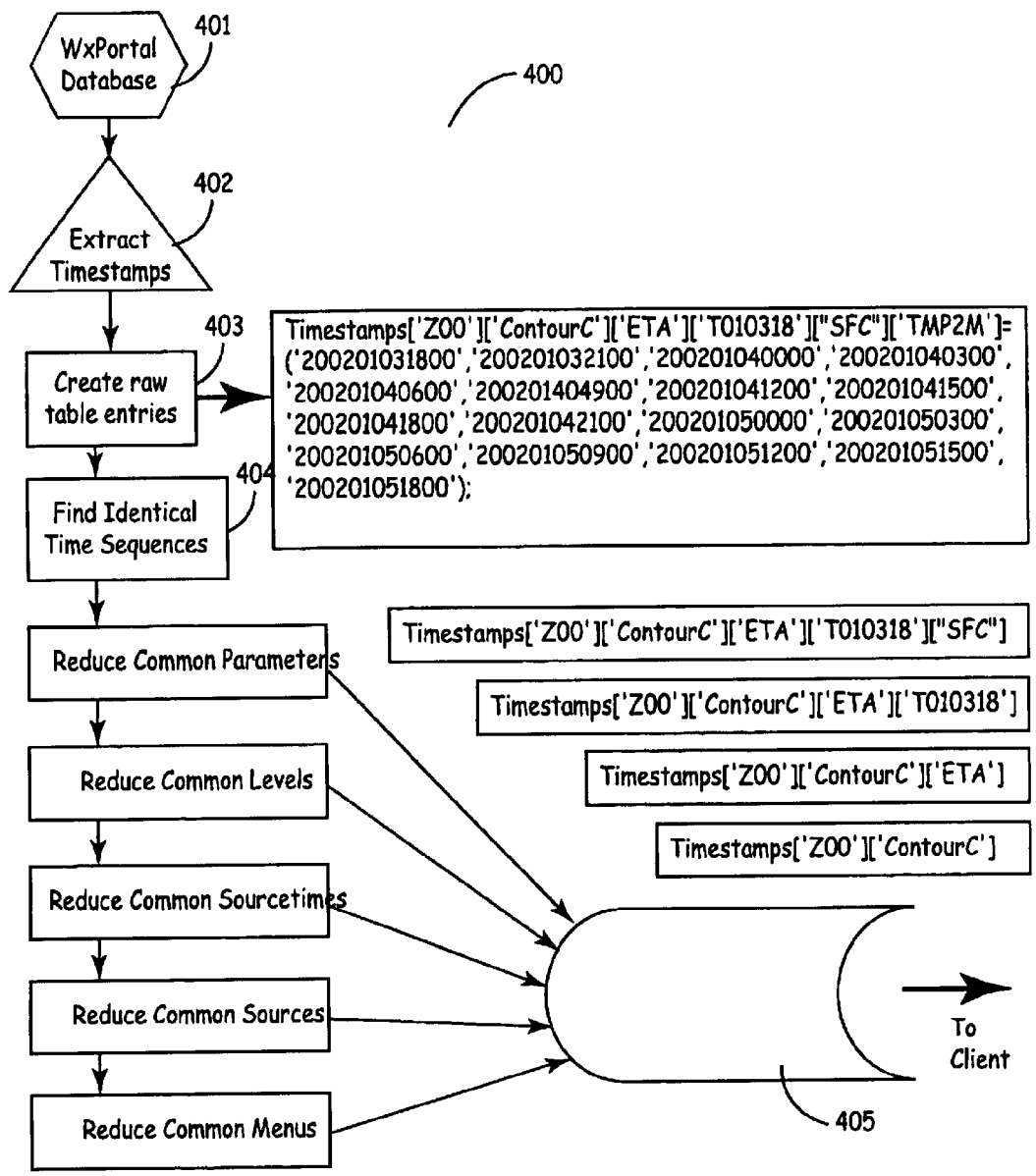
FIG. 16 is a flowchart of server-side time management functions of the weather portal system.
Figure 17:
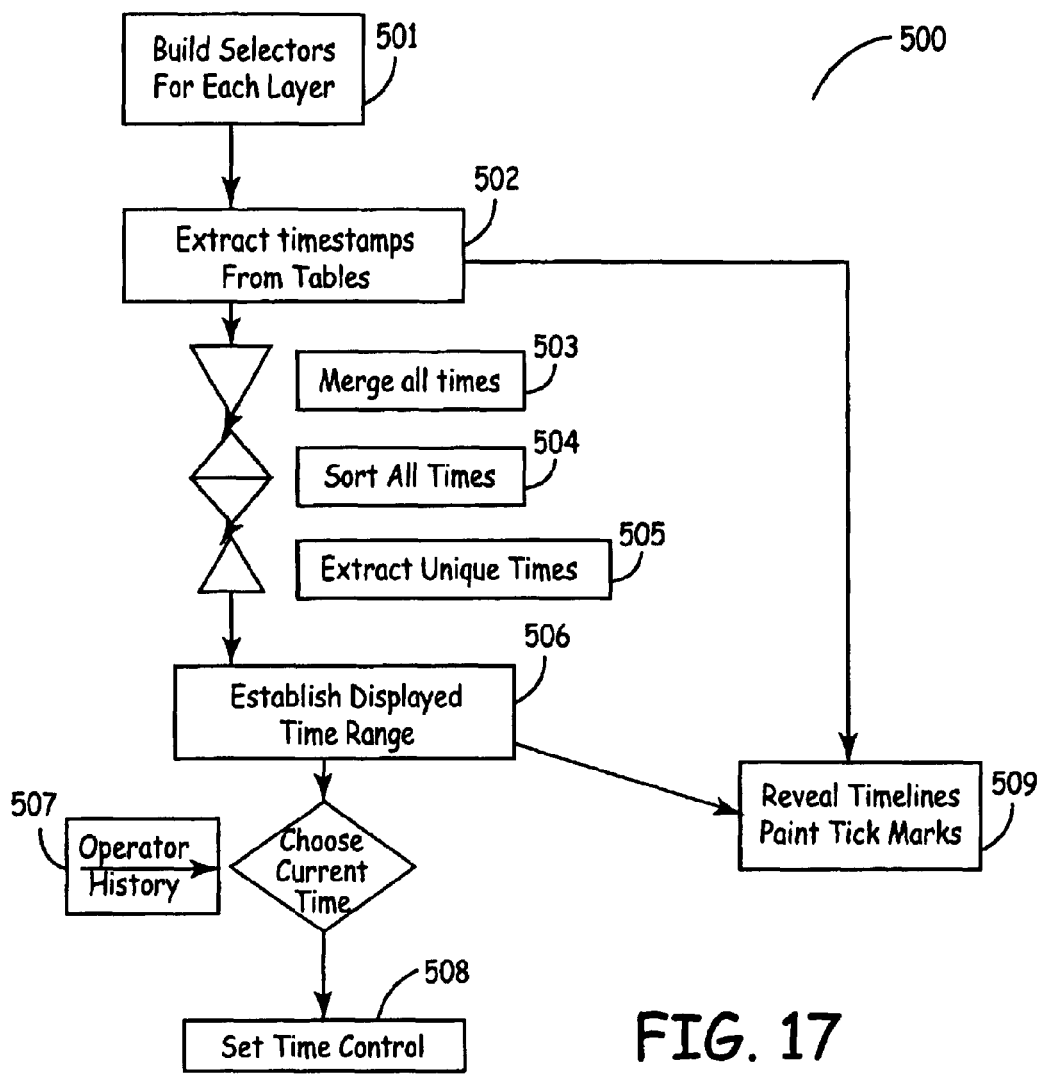
FIG. 17 is a flowchart of client-side time management functions of the weather portal system.

Implementation of the interactive timeline display and time controls resides partially in the Web server, as shown in FIG. 16, and partially in the Web client, as shown in FIG. 17, portions of the system. The portion residing in the server utilizes PHP server-side open source language and prepares special JAVASCRIPT tables to be loaded into the Web client when a user begins a new weather portal session. These tables become part of the JAVASCRIPT element providing the interactive interface between the user and the system. FIG. 16 summarizes the operation of the Web server resident element that prepares the specially formatted JAVASCRIPT tables used by the Web client to create the timeline display and time control features.

The server-side process 400 begins at the weather portal database 401. This database 401 is constantly updated 24 hours per day at intervals as small as microseconds as new data arrives at the NOAAPORT and is processed to produce images. This is a low entropy schema that preserves all the information to reconstitute any file name in the system. Each file name contains a unique timestamp for that image. These are concatenated onto a string of timestamps for that specific form of zone/layer/source/source time/level/parameter. A PHP encoded server process is used to extract all of the timestamps for a class of interest 402, and a JAVASCRIPT formatted prototype table entry is formed for each of the timestamp strings 403. If a few timestamp table entries, predetermined by an internal parameter, do not share in a larger common timestamp sequence, those unique entries are created in JAVASCRIPT and then a single common entry is produced for the remainder 404. The JAVASCRIPT tables produced by this process are stored in a special location on the server 405. This process commonly reduces storage required for these files by a factor of 10×, making it possible to transmit all information about images to a browser in a Web client in a user acceptable period of time when a session is started.

The portion of the interactive timeline and controls residing in the Web client is loaded into the Web client's browser when a session is begun by selecting the weather portal URL. The files transferred to and loaded on the browser consist of files that a) describe the appearance of the weather portal; b) contain the JAVASCRIPT code that implements the interactive control and behavior; c) provide "static" tables that define the geographical and user specific characteristics of the session; and d) dynamic tables containing the information on what products are present and the associated "reduced" timestamp tables. As shown in FIG. 17, when the user makes selections from the ensemble panel, timeline display and time control processes is triggered 500. The first step in the process is to determine which layers are active and what selections have been made 501. For each selection, indices into a JAVASCRIPT associative array are created 502. A "first guess" array access is made into the "reduced" tables prepared by the server in the following form: Timestamps ['ZOO'] ['layers'] ['products/sources'] ['source times'] ['levels'] ['parameters']. If no associative entry is present, then an attempt is made to retrieve the next most general form, i.e., Timestamps ['ZOO'] ['layers'] ['products/sources'] ['source times'] ['levels'], from the reduced tables. This process continues until an entry in the tables yielding a string of timestamps is located. The string of timestamps is split into individual members of a linear, numeric array for the particular selection.

While retaining the original timestamp arrays for all selections, a temporary time array is created with times merged from all the other time files 503. The merged temporary time array is sorted numerically in ascending sequence 504. Since the timestamps are formatted as year, month, day, hour, minute, the result is a time-ordered list containing the range of times to be displayed. Then, using a standard technique to remove adjacent duplicates, the sorted list is reduced to only those entries that are unique 505. This becomes the master time list. Based on parameterized criteria for a class of users, the specific start and stop times are assigned 506. For example, there may be 24 hours of NEXRAD images available for display; yet, the typical user class may be interested in only the previous 12 hours. Thus, the start time would be set later than the first NEXRAD image in the system. The graphical size of the timeline display is determined and the ratio of pixels to time-step established based on the start and stop time delimiters and not the actual number of image time-steps available for display with a particular layer selection. The determination of what time-step to display after a new group of selections is made is based on a) the time range established by the default start and stop times; b) the current wall-clock time at the site where the Web browser is operational; c) previous "current times" set during the session; and d) previous actions of the user 507. In the simplest case after a new instantiation of the weather portal, and without manually changing the start and stop times, the first images displayed correspond to those nearest in time to the current wall-clock time.

Once the current time has been established by default or setting 508, the position in the timeline display is set and the red time hairline becomes visible using HTML style sheet attributes 509. The hairline is set to sense a mouse-down and mouse-drag operation, which can reposition the hairline and change the current time setting. The timeliness for the timeline display is always present in the Web page but is kept hidden by the HTML style "visibility" attribute. Instead, for each selected layer, the corresponding timeline is made visible. Using the pixels to time-step ratio, the positions for tick marks for each timestamp in the array corresponding to that menu are made visible 509. For each layer, the timestamp nearest to the current time is used to form a unique file name that is then used to request that image from the server. The requesting of these images and their assembly into a composite presentation is performed by other parts of the weather portal JAVASCRIPT client code.

Interactive Multiple View Management and Display

The weather portal system provides considerable flexibility with respect to creating selective displays in a single presentation containing up to eight different layers of dynamic image sequences from massive amounts of weather-related data, including dynamic images representing satellite, radar, and model output, and up to six layers of static images such as maps, in a single assembled presentation. Creating and recreating these presentations may need to be done frequently and quickly during normal use of the weather portal system, whether during a single session or multiple sessions while preserving the environment of the user for reinstitution at each new session. Moreover, a simple means is provided for disseminating some of the saved presentation to other users.

Figure 18:
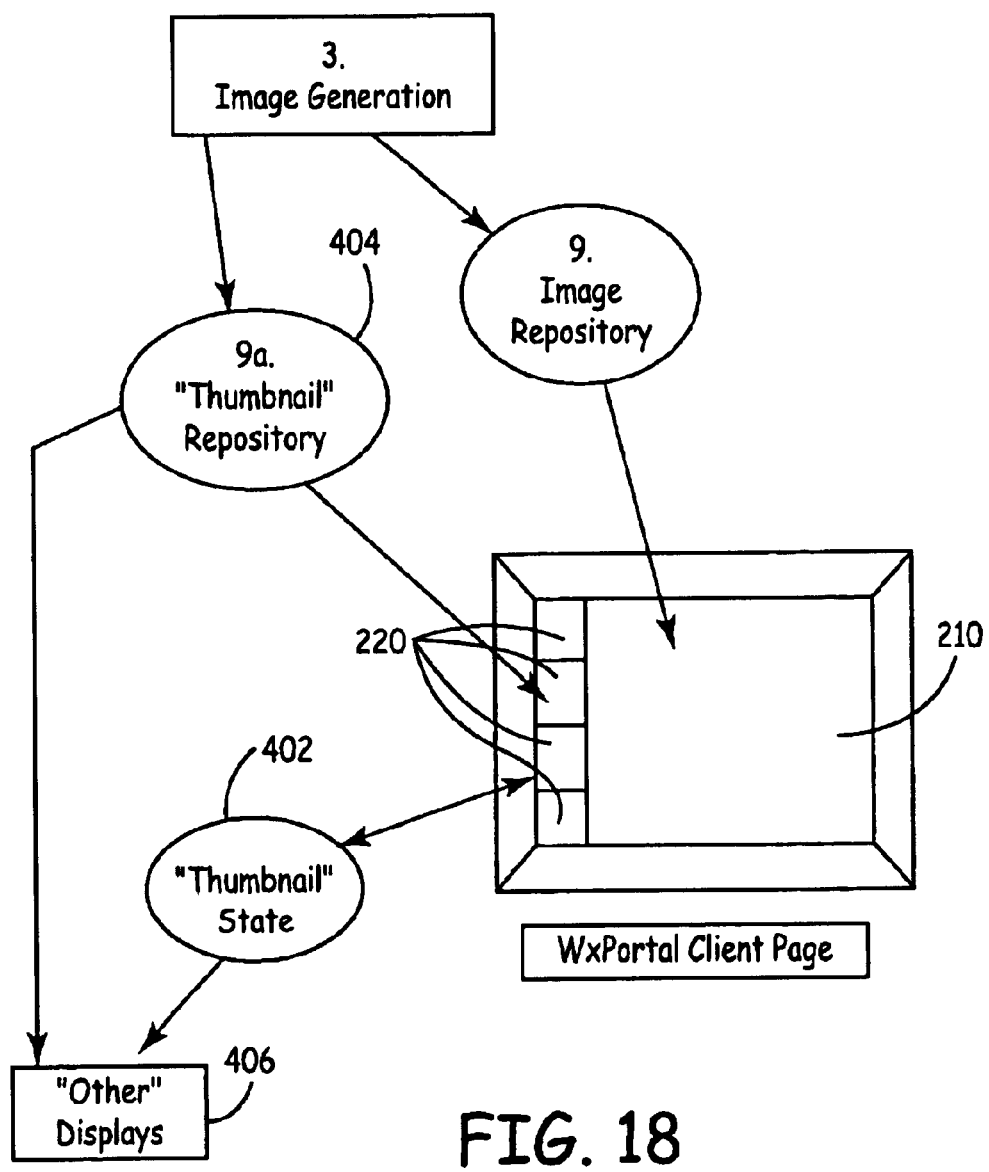
FIG. 18 is a diagram relating to the thumbnail features of the user interface.

As shown in FIGS. 4 and 18, the Web client provides for separately displaying miniature images, or thumbnails, in windows known as thumbnail windows 220, on the same Web page as the main graphics display area 210. To maintain visual clarity, these thumbnails are not digitally re-sampled versions of a main display graphics but are themselves separately generated by the system as is the main graphics display. In other words, the thumbnails are not, as is the common practice, a single digital image but instead are a fully parameterized, graphically miniaturized smaller version of the main display, preserving each and every independent layer. Thus, these thumbnails retain not only the graphical content of the presentation, they preserve within the Web client the entire user selected state or combination of parameters 402 at the moment the thumbnail is created. Significantly, by saving this state information, the imagery of any session recalling the thumbnail is relativized with respect to that session. Thus, for example, a future session based on an image displayed today of a model run from yesterday (24 hours previously) will be consistent with the present session, so that the image in the new session will represent model output from a run 24 hours prior to that session. Moreover, this user selected state also is preserved within the at least one server-side database 404 where it is used to re-instantiate the thumbnails within a Web client when a new session begins, as well as provide a means to distribute scenarios to others 406 in addition to the Web client.

Figure 19:
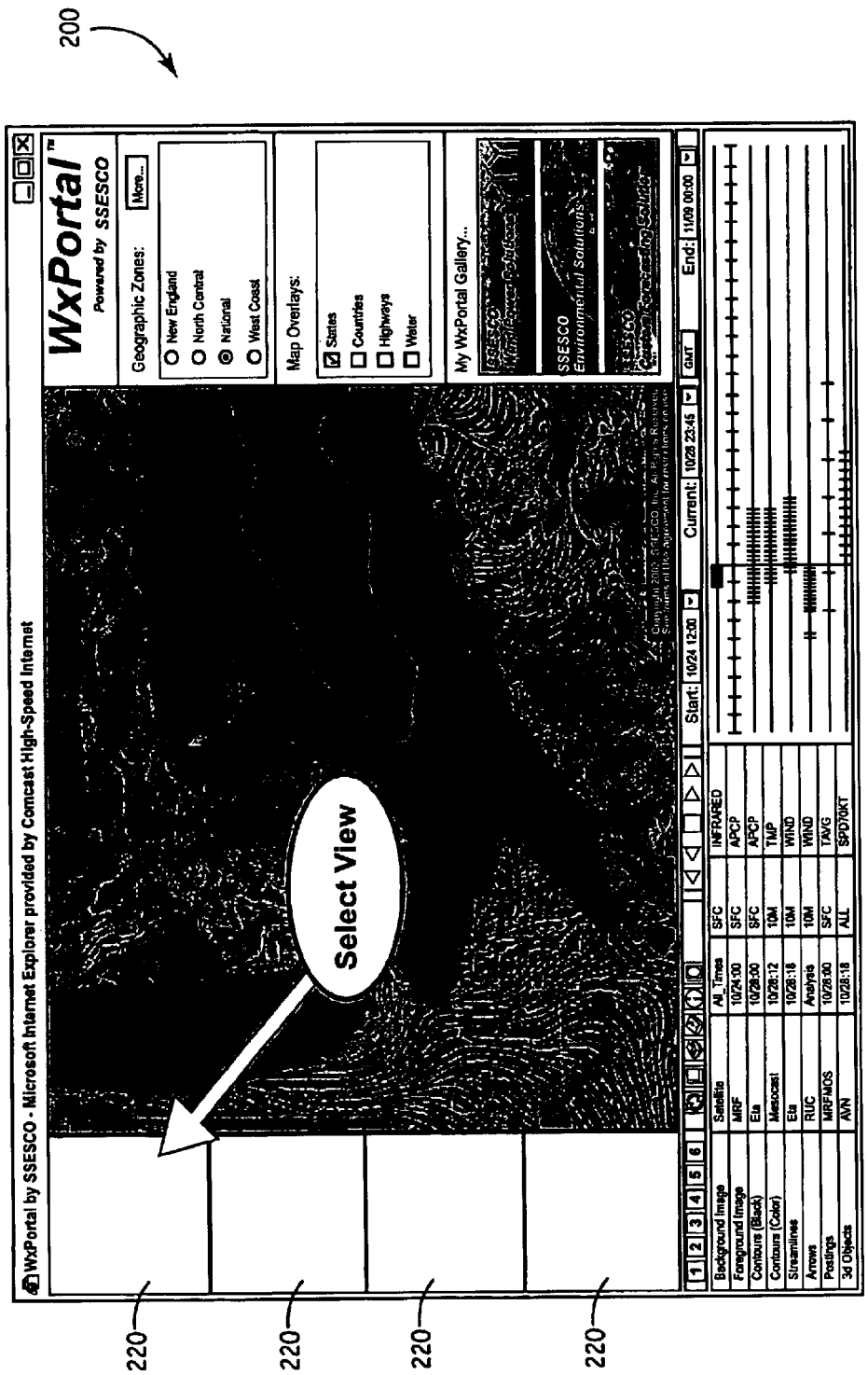
FIG. 19 is a view of the user interface showing thumbnail windows before presentations are saved therein.
Figure 20:
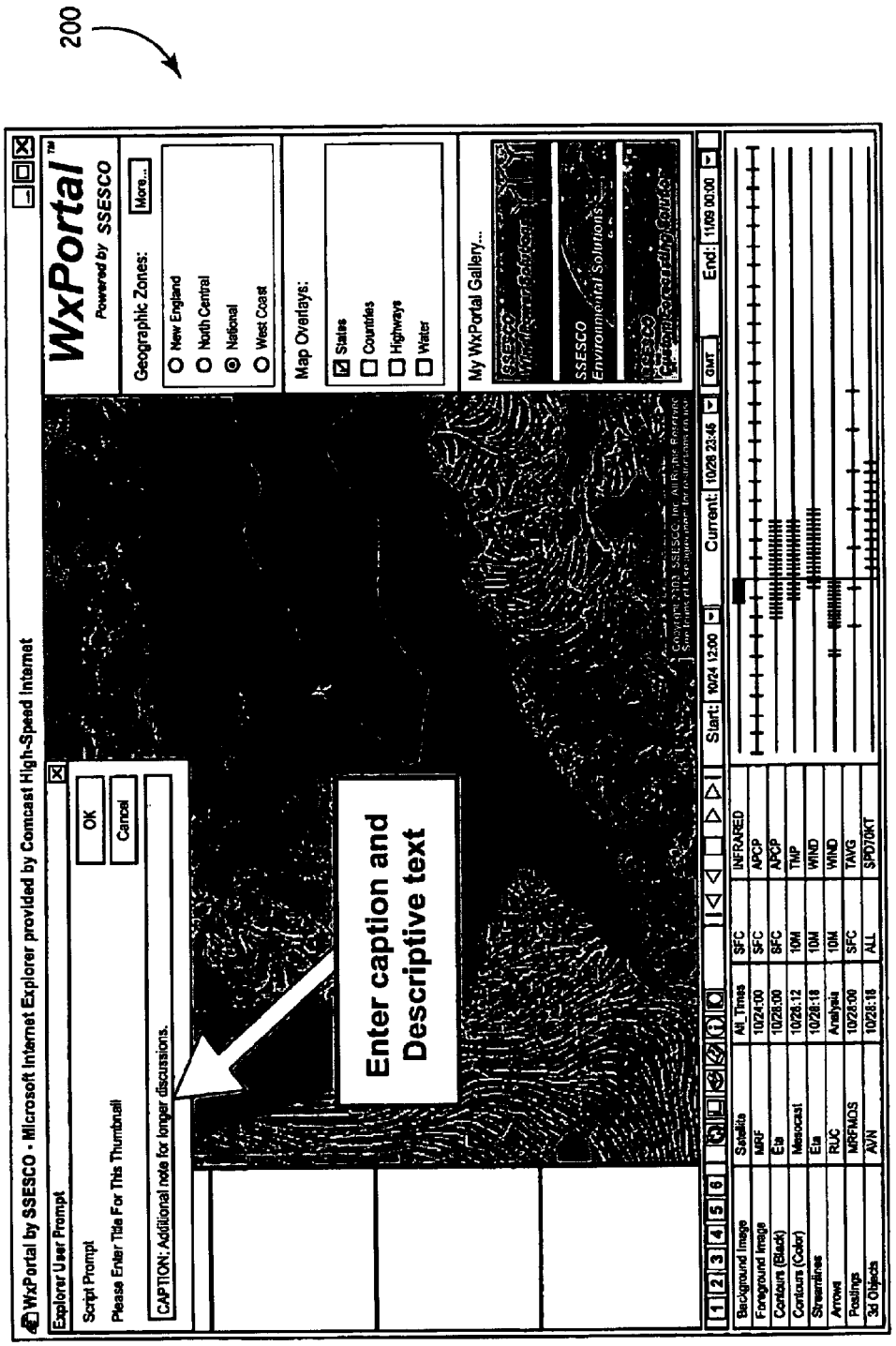
FIG. 20 is a view of the user interface after a dialogue window appears for labeling a saved thumbnail.
Figure 21:
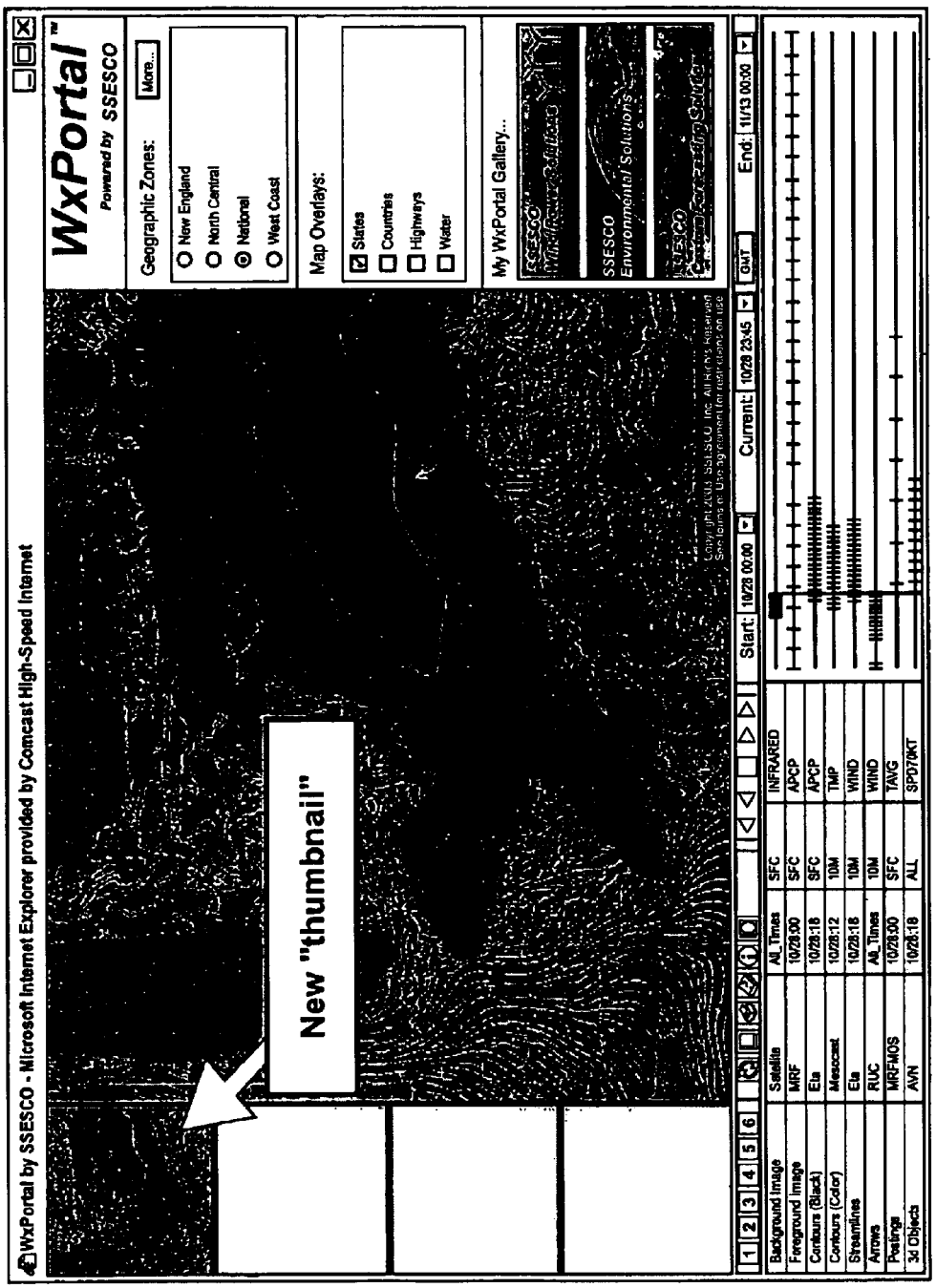
FIG. 21 is a view of the user interface with a saved thumbnail.

Implementation of the thumbnails includes parallel generation of reduced sized, fully layered images corresponding to the main graphics displays generated. The user clicks down on the main graphics display area, drags the cursor to one of the thumbnail windows, as shown in FIG. 19, and drops the presentation in the window by releasing the mouse button. As shown in FIG. 20, as a consequence of dragging the main graphics display to the thumbnail window, a dialogue opens requesting the user for a title or description for the newly created thumbnail. The text appears as an HTML "tooltip" of the active thumbnail window and is also saved in the Web client and server-side database with the user selected states. The server-side database is used to re-instantiate the thumbnails for use in future sessions and can also be interrogated to produce representations of a thumbnail along with descriptive material in forms and venues other than the weather portal Web page.

When thumbnails are presented in a thumbnail window, the process is identical to presentation in the main graphics display area. A series of requests for image files making up the individual layers is sent to the server and the resulting collection is assembled into a small HTML presentation for that thumbnail. This differs from conventional mechanisms wherein the thumbnail is a single sub-sampled representation of the main image. Then, when the user double-clicks on a thumbnail image on the user interface, the state information for that thumbnail, which is held in the Web page tables, replaces the current main graphics display state of the page. All of the selectors, buttons, and menus are set to this new state and a new main graphics display is formatted and the requests for main graphics display images generated and sent to the server. When all images have arrived, the main graphics display area is updated with the combined imagery.

For a more detailed understanding of the overall structure, architecture, and operation of a preferred embodiment, those skilled in the art are referred to the commented source code that is included with the application, the disclosure of which is hereby incorporated by reference.

The attachments and source code accompanying this application are copyrighted and no license or other relinquishment of copyrights in these materials is granted by virtue of the inclusion of these materials in this patent application, other than a limited license to copy these materials as part of the patent application process or as part of and for the limited purpose of obtaining a copy of the wrapper history.

Although the preferred embodiment and alternative embodiment(s) of the system presenting meteorological information using a browser interface have been described herein, it should be recognized that numerous changes and variations can be made to these embodiments and still be within the spirit of the present invention. In particular, other weather-related data from global regions other than the United States may be presented, from other heavenly bodies, or from space itself; and the concept of weather-related data should be viewed broadly to include physical phenomenon such as radiation, sensor values, chemical concentrations, etc. The scope of the present invention is to be defined by the claims.

That which is claimed:

1. A method of displaying forecast weather data, comprising the steps of:
    receiving historical forecast weather data and real-time weather data on an asynchronous basis from a plurality of sources, wherein said plurality of sources provide a plurality of data types including actual measured weather variables, weather image data from satellites or radar, and simulated data from weather forecasting models; and wherein at least two of said plurality of sources have different time bases;
    normalizing said historical forecast weather data and said real-time weather data to a normalized time scale; and
    dynamically and selectably overlaying the normalized historical forecast weather data and the normalized real-time weather data to present a single, visual image enabling a visual comparison between the normalized historical forecast weather data and the normalized real-time weather data to determine accuracy of said historical forecast weather data.

2. The method of claim 1, wherein said historical forecast weather data and said real-time weather data include a plurality of weather variables, and wherein the method further comprising the steps of selecting a subset of said weather variables and overlaying said subset of weather variables upon said single, visual image.

3. The method of claim 1, further comprising the step of presenting said single, visual image via a user interface onto a single Web page.

4. The method of claim 1, further comprising the step of presenting a plurality of said single, visual images in time sequence.

5. The method of claim 1, further comprising the step of presenting a graphical representation of said normalized time scale proximate said single, visual image.

6. The method of claim 5, wherein said graphical representation includes a timeline display having a plurality of timelines, wherein each timeline represents a different one of said plurality of sources.

7. A system for displaying forecast weather data, the system comprising:
  a computer system and a set of computer readable instructions, wherein said set of instructions include directing said computer system to:
    receive historical forecast weather data and real-time weather data on an asynchronous basis from a plurality of sources, wherein said plurality of sources provide a plurality of data types including actual measured weather variables, weather image data from satellites or radar, and simulated data from weather forecasting models; and wherein at least two of said plurality of sources have different time bases;
    normalize said historical forecast weather data and said real-time weather data to a normalized time scale; and
    dynamically and selectably overlay the normalized historical forecast weather data and the normalized real-time weather data to present a single, visual image enabling a visual comparison between the normalized historical forecast weather data and the normalized real-time weather data to determine accuracy of said historical forecast weather data.

8. The system of claim 7, wherein said historical forecast weather data and said real-time weather data include a plurality of weather variables, and wherein said set of instructions further includes directing said computer system to select a subset of said weather variables and overlay said subset of weather variables upon said single, visual image.

9. The system of claim 7, wherein said set of instructions further includes directing said computer system to: presenting said single, visual image via a user interface onto a single Web page.

10. The system of claim 7, wherein said set of instructions further includes directing said computer system to: present a plurality of said single, visual images in time sequence.

11. The system of claim 7, wherein said set of instructions further includes directing said computer system to: present a graphical representation of said normalized time scale proximate said single, visual image.

12. The system of claim 11, wherein said graphical representation includes a timeline display having a plurality of timelines, wherein each timeline represents a different one of said plurality of sources.

* * * * *

UNITED STATES PATENT AND TRADEMARK OFFICE
CERTIFICATE OF CORRECTION

PATENT NO. : 6,985,837 B2
APPLICATION NO. : 10/286473
DATED : January 10, 2006
INVENTOR(S) : Moon et al.

It is certified that error appears in the above-identified patent and that said Letters Patent is hereby corrected as shown below:

In Section 56, References Cited, add U.S. Patent Cited --6,052,648 4/2000 Burfeind et al.--

Column 4, line 60, please delete "his" and insert --this.--

Column 5, line 28, please delete "lest" and insert --least.--

Column 5, line 37, please delete "scale.," and insert --scale.--

Signed and Sealed this

Seventeenth Day of April, 2007

JON W. DUDAS
*Director of the United States Patent and Trademark Office*